(12) United States Patent
Albsmeier et al.

(10) Patent No.: US 9,331,498 B2
(45) Date of Patent: May 3, 2016

(54) POWER GENERATION SYSTEM THAT PROVIDES EFFICIENT BATTERY CHARGER SELECTION

(75) Inventors: Eric D. Albsmeier, Sheboygan, WI (US); Richard A. Mauk, Sheboygan, WI (US); Harrison C. Chiu, Grafton, WI (US)

(73) Assignee: Kohler Co., Kohler, WI (US)

( * ) Notice: Subject to any disclaimer, the term of this patent is extended or adjusted under 35 U.S.C. 154(b) by 475 days.

(21) Appl. No.: 13/606,488

(22) Filed: Sep. 7, 2012

(65) Prior Publication Data
US 2014/0070760 A1 Mar. 13, 2014

(51) Int. Cl.
*H02J 7/00* (2006.01)
*H02J 7/14* (2006.01)

(52) U.S. Cl.
CPC ............. *H02J 7/0013* (2013.01); *H02J 7/0047* (2013.01); *H02J 7/0054* (2013.01); *H02J 7/1423* (2013.01); *H02J 2007/005* (2013.01)

(58) Field of Classification Search
CPC .................................................. H02J 7/1423
See application file for complete search history.

(56) References Cited

U.S. PATENT DOCUMENTS

| | | | | |
|---|---|---|---|---|
| 1,095,967 A * | 5/1914 | Lister | ................... | B60L 11/126 180/65.245 |
| 1,660,397 A * | 2/1928 | Sayles | ....................... | H02J 7/14 290/31 |
| 1,898,370 A * | 2/1933 | Hughes | ................... | F02N 11/08 123/146.5 R |
| 2,152,405 A * | 3/1939 | Dreischerf | .......... | F02N 11/0866 290/37 R |
| 2,564,957 A * | 8/1951 | Cermak | ................ | H02J 7/1423 200/16 B |
| 2,692,953 A * | 10/1954 | Markett, Jr. | ............. | F02P 15/12 290/37 R |
| 2,729,750 A * | 1/1956 | Draper | ................... | H02J 7/1423 290/36 R |
| 2,772,385 A * | 11/1956 | Dawkins | ................... | H02J 7/12 307/41 |
| 2,866,907 A * | 12/1958 | Gebhard | ............... | H02J 7/1423 290/36 R |
| 3,108,190 A * | 10/1963 | Gebhard | ............. | F02N 11/0866 290/36 R |
| 3,484,681 A * | 12/1969 | Grady, Jr. | ........... | G01R 31/3682 320/136 |
| 3,616,872 A * | 11/1971 | Taylor | ................. | B60L 11/1805 105/51 |
| 3,646,356 A * | 2/1972 | Hoffman | ................... | H02J 3/42 307/57 |
| 3,696,283 A * | 10/1972 | Ackley, III | .................... | 320/110 |

(Continued)

FOREIGN PATENT DOCUMENTS

CA 2213018 * 10/2001
DE 102008051078 A1 4/2009

(Continued)

OTHER PUBLICATIONS http://www.americanpowerinc.com/dc%20gen.htm.*

(Continued)

*Primary Examiner* — Drew A Dunn
*Assistant Examiner* — John Trischler
(74) *Attorney, Agent, or Firm* — Schwegman, Lundberg & Woessner, P.A.

(57) ABSTRACT

Some embodiments relate to a power generation system. The power generation system includes a first generator and a first battery charger. The first battery charger is adapted to charge a first battery and a second battery. The first battery and the second battery are each adapted to provide power to start the first generator. The power generation system further includes a controller that determines a state of charge for each of the first battery and the second battery. Based on the state of charge for each of the first battery and the second battery, the controller determines which of the first battery and the second battery receives charging current from the first battery charger.

4 Claims, 2 Drawing Sheets

(56) References Cited

U.S. PATENT DOCUMENTS

| | | | | |
|---|---|---|---|---|
| 3,720,839 A * | 3/1973 | Spahr | F02N 11/0807 | 290/37 R |
| 3,835,362 A * | 9/1974 | Greene | G01R 31/3606 | 320/134 |
| 3,874,472 A * | 4/1975 | Deane | B60L 11/126 | 180/65.245 |
| 3,890,556 A * | 6/1975 | Melling et al. | 320/161 | |
| 3,904,947 A * | 9/1975 | Crews | 320/138 | |
| 3,917,017 A * | 11/1975 | Deane | B60L 11/126 | 180/65.245 |
| 3,949,289 A * | 4/1976 | Day | F02N 11/0866 | 307/10.7 |
| 4,019,111 A * | 4/1977 | Bennefeld | 320/142 | |
| 4,052,656 A * | 10/1977 | Lavell et al. | 320/156 | |
| 4,058,759 A * | 11/1977 | Halfhill | G06F 1/26 | 307/16 |
| 4,081,738 A * | 3/1978 | Roller | B63H 23/24 | 307/71 |
| 4,082,992 A * | 4/1978 | Day | B60R 16/0235 | 307/10.7 |
| 4,156,836 A * | 5/1979 | Wiley | H02J 7/16 | 307/84 |
| 4,161,682 A * | 7/1979 | Corvette | 320/105 | |
| 4,309,644 A * | 1/1982 | Reimers et al. | 318/139 | |
| 4,314,193 A * | 2/1982 | Mortonson | 322/28 | |
| 4,336,485 A * | 6/1982 | Stroud | H02J 7/1423 | 307/18 |
| 4,345,197 A * | 8/1982 | Wheadon | H02J 7/1423 | 320/124 |
| 4,346,338 A * | 8/1982 | Nakamoto et al. | 322/28 | |
| 4,347,473 A * | 8/1982 | Stroud | 320/126 | |
| 4,348,628 A * | 9/1982 | Loucks | H02J 7/1423 | 180/65.1 |
| 4,348,629 A * | 9/1982 | Sievers | 322/99 | |
| 4,361,796 A * | 11/1982 | Akita et al. | 322/99 | |
| 4,396,880 A * | 8/1983 | Windebank | 320/156 | |
| 4,488,198 A * | 12/1984 | Christen | H02H 7/062 | 307/20 |
| 4,604,565 A * | 8/1986 | Yokota | H02J 7/1423 | 290/37 A |
| 4,616,162 A * | 10/1986 | Radomski | B60L 1/00 | 307/10.1 |
| 4,636,706 A * | 1/1987 | Bowman | H02J 7/1453 | 320/153 |
| 4,757,249 A * | 7/1988 | Farber | H02J 7/1423 | 307/84 |
| 4,829,228 A * | 5/1989 | Buetemeister | 322/27 | |
| 5,002,840 A * | 3/1991 | Klebenow et al. | 429/9 | |
| 5,097,194 A * | 3/1992 | Walton et al. | 320/128 | |
| 5,122,722 A | 6/1992 | Goedken et al. | | |
| 5,166,596 A | 11/1992 | Goedken | | |
| 5,193,067 A | 3/1993 | Sato et al. | | |
| 5,204,610 A * | 4/1993 | Pierson et al. | 320/126 | |
| 5,206,579 A | 4/1993 | Kawate et al. | | |
| 5,233,229 A * | 8/1993 | Kohl | H02J 7/1423 | 307/10.1 |
| 5,254,936 A * | 10/1993 | Leaf et al. | 322/90 | |
| 5,316,868 A * | 5/1994 | Dougherty et al. | 429/9 | |
| 5,325,497 A * | 6/1994 | Jaffe et al. | 711/114 | |
| 5,420,493 A | 5/1995 | Hargadon et al. | | |
| 5,422,517 A * | 6/1995 | Verney et al. | 307/29 | |
| 5,438,225 A * | 8/1995 | Berger | 307/66 | |
| 5,488,283 A * | 1/1996 | Dougherty et al. | 307/10.1 | |
| 5,504,416 A | 4/1996 | Holloway et al. | | |
| 5,659,240 A | 8/1997 | King | | |
| 5,689,174 A * | 11/1997 | Pacheco, Sr. | B60K 6/26 | 180/65.1 |
| 5,803,215 A | 9/1998 | Henze et al. | 191/2 | |
| 5,844,325 A * | 12/1998 | Waugh | H01M 10/122 | 307/10.7 |
| 5,850,136 A * | 12/1998 | Kaneko | 320/119 | |
| 5,977,744 A * | 11/1999 | Williams et al. | 320/104 | |
| 5,986,431 A * | 11/1999 | Hayes | 320/112 | |
| 6,127,798 A * | 10/2000 | Lansang et al. | 320/104 | |
| 6,204,632 B1 * | 3/2001 | Nierescher et al. | 320/116 | |
| 6,215,277 B1 * | 4/2001 | Renehan | 320/117 | |
| 6,215,282 B1 | 4/2001 | Richards et al. | | |
| 6,222,343 B1 | 4/2001 | Crisp et al. | | |
| 6,229,279 B1 * | 5/2001 | Dierker | 320/104 | |
| 6,275,001 B1 * | 8/2001 | Dierker | 320/103 | |
| 6,331,761 B1 | 12/2001 | Kumar et al. | | |
| 6,333,619 B1 | 12/2001 | Chavez et al. | | |
| 6,466,024 B1 * | 10/2002 | Rogers | 324/427 | |
| 6,586,911 B1 * | 7/2003 | Smith | G06F 1/3203 | 320/134 |
| 6,734,651 B2 * | 5/2004 | Cook et al. | 320/103 | |
| 6,801,014 B1 | 10/2004 | Chitsazan et al. | | |
| 6,815,931 B1 * | 11/2004 | Wells et al. | 320/164 | |
| 6,831,464 B2 | 12/2004 | Yang | | |
| 6,924,621 B2 * | 8/2005 | Jabaji et al. | 320/123 | |
| 6,930,469 B2 | 8/2005 | Krieger et al. | | |
| 7,061,138 B2 * | 6/2006 | Richter | H02J 7/1423 | 307/10.7 |
| 7,061,209 B2 | 6/2006 | Mori | | |
| 7,164,214 B2 * | 1/2007 | Eisenberger et al. | 307/29 | |
| 7,189,125 B2 * | 3/2007 | Okuyama | 440/1 | |
| 7,208,915 B2 | 4/2007 | Kubota et al. | | |
| 7,235,898 B1 * | 6/2007 | Jones et al. | 307/9.1 | |
| 7,456,611 B2 | 11/2008 | Mullett et al. | | |
| 7,570,011 B2 * | 8/2009 | Waikar et al. | 320/104 | |
| 7,573,145 B2 * | 8/2009 | Peterson | 290/44 | |
| 7,591,331 B2 * | 9/2009 | Glonner et al. | 180/65.265 | |
| 7,642,753 B2 * | 1/2010 | Simpson et al. | 320/162 | |
| 7,855,466 B2 | 12/2010 | Bax | | |
| 7,872,362 B2 * | 1/2011 | Kato et al. | 290/40 C | |
| 7,884,502 B2 * | 2/2011 | Lyman et al. | 307/64 | |
| 7,999,405 B2 * | 8/2011 | Peterson | 290/40 C | |
| 8,004,110 B2 * | 8/2011 | Kouwa | 307/10.1 | |
| 8,022,572 B2 | 9/2011 | Vyas et al. | | |
| 8,076,900 B1 * | 12/2011 | Brown | 320/105 | |
| 8,169,755 B2 | 5/2012 | Sugita | | |
| 8,314,587 B2 * | 11/2012 | White et al. | 320/103 | |
| 8,354,818 B2 * | 1/2013 | Louch et al. | 320/101 | |
| 8,441,228 B2 * | 5/2013 | Brabec | 320/104 | |
| 8,749,193 B1 * | 6/2014 | Sullivan | 320/104 | |
| 8,829,855 B2 * | 9/2014 | Albsmeier et al. | 320/126 | |
| 9,219,294 B2 | 12/2015 | Albsmeier et al. | | |
| 2001/0028237 A1 * | 10/2001 | Floyd | H02J 7/0054 | 320/107 |
| 2002/0063549 A1 * | 5/2002 | Floyd | B60L 8/00 | 320/103 |
| 2003/0122360 A1 * | 7/2003 | Badr et al. | 280/789 | |
| 2004/0155625 A1 * | 8/2004 | Floyd | B60R 25/021 | 320/104 |
| 2004/0164709 A1 * | 8/2004 | Kapsokavathis et al. | 320/132 | |
| 2004/0189254 A1 * | 9/2004 | Kapsokavathis et al. | 320/132 | |
| 2005/0189923 A1 * | 9/2005 | Ohishi et al. | 320/138 | |
| 2005/0275372 A1 | 12/2005 | Crowell | | |
| 2006/0055377 A1 * | 3/2006 | Okubo et al. | 320/166 | |
| 2007/0276547 A1 | 11/2007 | Miller | | |
| 2008/0136371 A1 * | 6/2008 | Sutardja | 320/109 | |
| 2008/0231117 A1 * | 9/2008 | Bucur | H02J 7/0013 | 307/48 |
| 2009/0039705 A1 * | 2/2009 | Lyman et al. | 307/64 | |
| 2010/0052614 A1 | 3/2010 | Mariels | | |
| 2010/0127668 A1 * | 5/2010 | Fuchs | H02J 7/0021 | 320/162 |
| 2010/0228413 A1 * | 9/2010 | Fujitake | B60L 11/14 | 701/22 |
| 2010/0253290 A1 * | 10/2010 | Hammerstrom | 320/137 | |
| 2011/0018340 A1 * | 1/2011 | Patterson | 307/10.1 | |
| 2011/0084650 A1 * | 4/2011 | Kaiser et al. | 320/107 | |
| 2011/0101778 A1 | 5/2011 | Yang | | |
| 2011/0175357 A1 * | 7/2011 | Navetta | F02D 29/06 | 290/47 |
| 2011/0215641 A1 | 9/2011 | Peterson et al. | | |
| 2011/0227537 A1 | 9/2011 | Maleus | | |
| 2011/0241611 A1 | 10/2011 | Watanabe et al. | | |
| 2011/0281679 A1 * | 11/2011 | Larrabee | B64C 39/024 | 475/5 |
| 2011/0291621 A1 | 12/2011 | Iles et al. | | |
| 2012/0074893 A1 * | 3/2012 | Cole | 320/101 | |
| 2012/0095612 A1 | 4/2012 | Rivers, Jr. et al. | | |

(56) References Cited

U.S. PATENT DOCUMENTS

| | | | |
|---|---|---|---|
| 2012/0112702 A1* | 5/2012 | Steigerwald | B60L 3/0069 320/137 |
| 2012/0139486 A1* | 6/2012 | Holland | 320/109 |
| 2012/0175876 A1 | 7/2012 | Pendray et al. | |
| 2012/0239214 A1* | 9/2012 | Nakashima et al. | 700/291 |
| 2012/0256483 A1* | 10/2012 | Nakashima et al. | 307/19 |
| 2013/0073126 A1 | 3/2013 | Kumar et al. | |
| 2013/0328530 A1* | 12/2013 | Beaston | H01M 10/4207 320/128 |
| 2014/0055081 A1* | 2/2014 | Albsmeier et al. | 320/107 |
| 2014/0084598 A1 | 3/2014 | Albsmeier et al. | |
| 2014/0210401 A1* | 7/2014 | Di Cristofaro | H02J 7/0022 320/107 |

FOREIGN PATENT DOCUMENTS

| | | | |
|---|---|---|---|
| EP | 1568533 A1 | | 8/2005 |
| GB | 113479 A | | 2/1918 |
| JP | 01117629 A | * | 5/1989 |
| JP | 06022503 A | * | 1/1994 |
| JP | 2000-308208 A | | 11/2000 |
| JP | 2003155968 A | * | 5/2003 |
| JP | 2005-264860 A | | 9/2005 |
| JP | 2005-0264860 A | | 9/2005 |
| JP | 2005264860 A | * | 9/2005 |
| JP | 2012-147633 A | | 8/2012 |
| JP | 2012147633 | | 8/2012 |
| KR | 10-1132770 B1 | | 4/2012 |
| WO | WO-2008/070163 A2 | | 6/2008 |
| WO | WO-2011/088450 A2 | | 7/2011 |

OTHER PUBLICATIONS

Merriam Webster Dictionary, published Apr. 25, 2009, accessed Apr. 14, 2015, https://web.archive.org/web/20090425162817/http://www.merriam-webster.com/dictionary/engine.*

"Greenwood Car Show needs Volunteers," Doree, Published Jul. 13, 2009, Accessed Apr. 15, 2015, http://www.phinneywood.com/2009/06/page/7/.*

"Starting and Charging," Firestone, Published Mar. 1, 2012, Accessed Apr. 15, 2015, https://web.archive.org/web/20120301011512/http://m.fcacmobile.com/auto_service/starting_and_charging.*

Electropaedia ("State of Charge (SOC) Determination," Electropaedia, mpoweruk, published May 9, 2008, Accessed Apr. 9, 2015, web.archive.org/web/20080509145838/http://www.mpoweruk.com/soc.htm).*

"State of Charge (SOC) Determination," Electropaedia, mpoweruk, published May 9, 2008, Accessed Apr. 9, 2015, web.archive.org/web/20080509145838/http://www.mpoweruk.com/soc.htm.*

"What is the difference between Diesel Engine and External Combustion Engine," Bhishm Khanna, Preserve Article, Published Dec. 30, 2010, Saved to Wayback Machine Internet Archive Oct. 19, 2011, Accessed Online Aug. 21, 2015, http://web.archive.org/web/20111019102913/http://www.preservearticles.com/201012302049/difference-between-diesel-engine-and-extern.*

"Battery keeps dying," 88 Cutty Classic, OldsPower.com, Published Mar. 9, 2010, Accessed Online Jul. 29, 2015, http://www.oldspower.com/vb/showthread.php?t=52200.*

"Effects of AC Ripple Current on VRLA Battery Life," Emerson Network Power, Published 2009&2010, Accessed Online Jul. 2015, http://www.emersonnetworkpower.com/documentation/en-us/brands/liebert/documents/white%20papers/effects%20of%20ac%20ripple%20current%20on%20vrla%20battery%20life.pdf.*

"European Application Serial No. 13182040.9, European Search Report mailed Feb. 3, 2014", 11 pgs.

"European Application Serial No. 13180339.7, European Search Report dated Dec. 4, 2013", 8 pgs.

"U.S. Appl. No. 13/591,595, Non Final Office Action mailed Oct. 6, 2014", 22 pgs.

"U.S. Appl. No. 13/591,595, Response filed Jan. 5, 2015 to Non Final Office Action mailed Oct. 6, 2014", 8 pgs.

"U.S. Appl. No. 13/591,595, Final Office Action mailed May 11, 2015", 26 pgs.

"Chinese Application Serial No. 201310361761.5, Office Action mailed Apr. 3, 2015", (w/ English Translation), 11 pgs.

"European Application Serial No. 131803307, Response filed Aug. 19, 2014 to Office Action mailed Dec. 16, 2013", 16 pgs.

"European Application Serial No. 13182040.9, Response filed Sep. 10, 2014 to European Search Report mailed Feb. 3, 2014", 12 pgs.

"European Application Serial No. 13183671.0, Response filed Oct. 1, 2014 to European Search Report mailed Jan. 31, 2014", 22 pgs.

"U.S. Appl. No. 13/627,056, Non Final Office Action mailed Feb. 28, 2014", 11 pgs.

"U.S. Appl. No. 13/627,056, Notice of Allowance mailed May 27, 2014", 8 pgs.

"U.S. Appl. No. 13/627,056, Response filed May 15, 2014 to Non Final Office Action mailed Feb. 28, 2014", 8 pgs.

"Chinese Application Serial No. 201310392335.8, Office Action mailed Apr. 3, 2015", (w/ English Summary), 9 pgs.

"Chinese Application Serial No. 201310430572.9, Office Action mailed Mar. 2, 2015", (w/ English Summary), 9 pgs.

"European Application Serial No. 13183671.0, European Search Report mailed Mar. 31, 2014", 11 pgs.

U.S. Appl. No. 13/591,595, Corrected Notice of Allowance mailed Sep. 28, 2015, 5 pgs.

U.S. Appl. No. 13/591,595, Notice of Allowance mailed Aug. 28, 2015, 9 pgs.

U.S. Appl. No. 13/591,595, Response fiied Aug. 11, 2015 to Final Office Action mailed May 11, 2015, 9 pgs.

Chinese Application No. 201310392335.8, Second Office Action dated Nov. 19, 2015, 7 pgs.

European Application Serial No. 13180339.7, Office Action mailed Jun. 26, 2015, 6 pgs.

European Patent Office Action No. 13 182 040,9, Communication pursuant to Article 94(3) EPC dated Jul. 24, 2015, 6 pgs.

Machine Translation of JP 2012-147633A, published Aug. 2, 2012, 19 pgs.

* cited by examiner

POWER GENERATION SYSTEM THAT PROVIDES EFFICIENT BATTERY CHARGER SELECTION

TECHNICAL FIELD

Embodiments pertain to a power generation system, and more particularly to a power generation system that optimizes the power provided to charge batteries.

BACKGROUND

Power generation systems are used to selectively provide power to various types of power consuming loads. Some power generation systems include batteries that are used to start engines and/or generators within the power generation system. One common cause of generator malfunction is that the starting batteries do not provide sufficient starting current.

The batteries in such conventional power generation systems are typically either charged by a primary power or a secondary power source (e.g., the generator) when the primary power source becomes unavailable. These types of systems typically include a battery charger that charges each battery.

One of drawbacks with some of the battery chargers in existing power generation systems is that they operate independently of the rest of the power generation system. Most battery chargers are not utilized to their full capacity because they are typically connected to batteries that are in a fully charged state. Therefore, the battery chargers spend the majority of their time supplying current to their respective battery at a relatively low rate.

Another drawback with existing power generation systems is that the battery chargers in such systems are unable to work together to share charging current. Therefore, the batteries may be charged at a slower rate.

Therefore, a need exists for a power generation system that includes battery chargers that work together in order to utilize their capacity more efficiently. By working together the battery chargers could potentially increase their charging rate.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
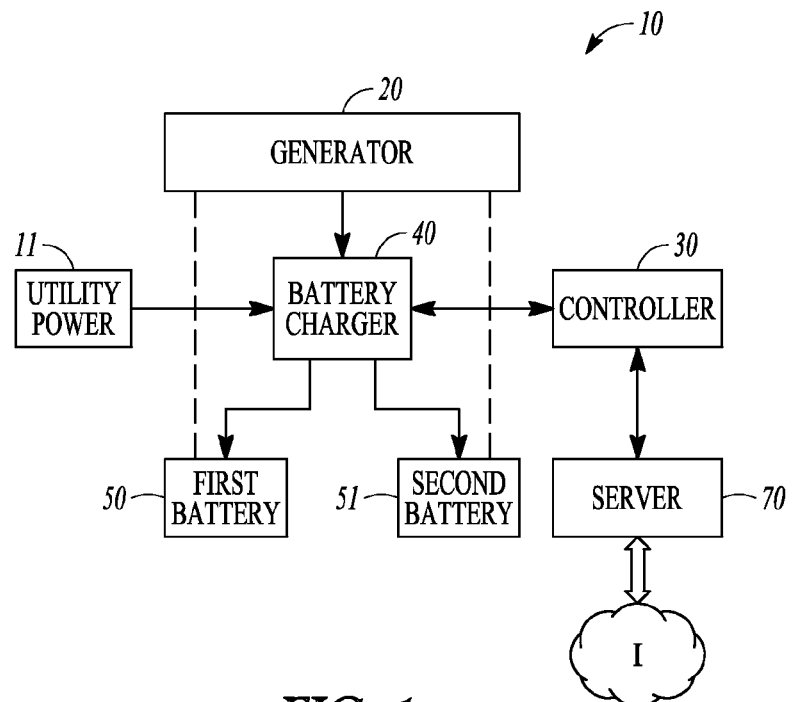
FIG. 1 is a functional block diagram illustrating an example power generation system that includes a battery charging system.

FIG. 1 is a functional block diagram illustrating an example power generation system 10. The power generation system 10 includes a first generator 20 and a first battery charger 40. In the example embodiment that is shown in FIG. 1, the first battery charger 40 is adapted to charge a first battery 50 and a second battery 51. The first battery 50 and the second battery 51 are each adapted to provide power to start the first generator 20.

The power generation system 10 further includes a controller 30 that determines a state of charge for each of the first battery 50 and the second battery 51. Based on the state of charge for each of the first battery 50 and the second battery 51, the controller 30 determines which of the first battery 50 and the second battery 51 receives charging current from the first battery charger 40.

In some embodiments, the first generator 20 includes an internal combustion engine that drives an alternator. It should be noted that other types of generators (i.e., power generation devices) are contemplated without departing from the scope of the invention.

Embodiments are contemplated where the first battery charger 40 is adapted to receive power from a primary power source 11. As an example, the primary power source 11 may be utility power.

In some embodiments, the controller 30 is a generator controller that operates the first generator 20. Embodiments are also contemplated where the controller 30 operates the first battery charger 40.

It should be noted that the controller 30 may display information relating to a charge level of the first battery 50 and the second battery 51. As an example, the controller 30 may display the charging profile that is currently being used by the first battery charger 40 to charge the first battery 50 and/or the second battery 51 (among other operating parameters that are associated with the first battery charger 40).

As another example, the controller 30 may display the voltage, current and/or temperature at the battery terminals of the first battery 50 and the second battery 51 (or some other part of the batteries). As yet another example, the controller 30 may display faults, warnings and/or other conditions relating to the health of the first battery 50, the second battery 51, the first battery charger 40 and/or the first generator 20.

Figure 2:
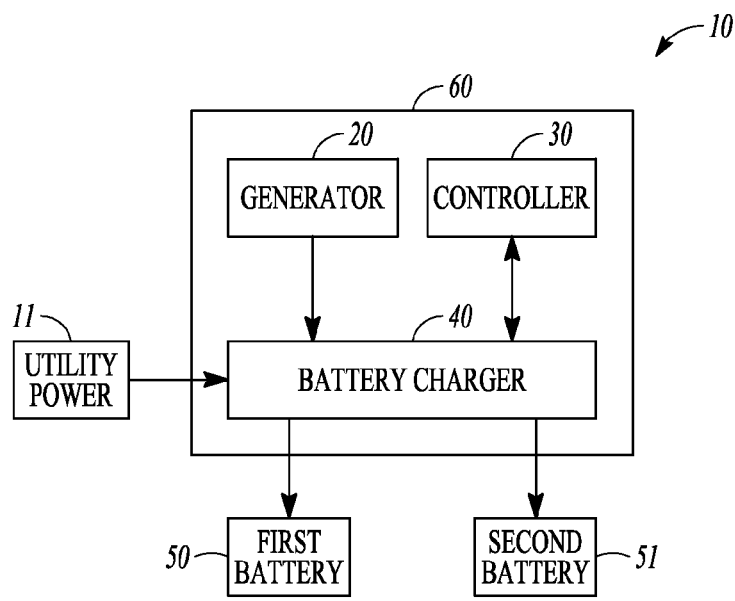
FIG. 2 is a functional block diagram similar to FIG. 1 where the power generation system includes an enclosure where a controller, a first generator and a first battery charger are all within the enclosure.

In the example embodiment that is illustrated in FIG. 1, the first battery charger 40, the controller 30 and the first generator 20 are not located within the same enclosure. In the example embodiment that is illustrated in FIG. 2, the first battery charger 40, the controller 30 and the first generator 20 are all located within the same enclosure 60.

Figure 3:
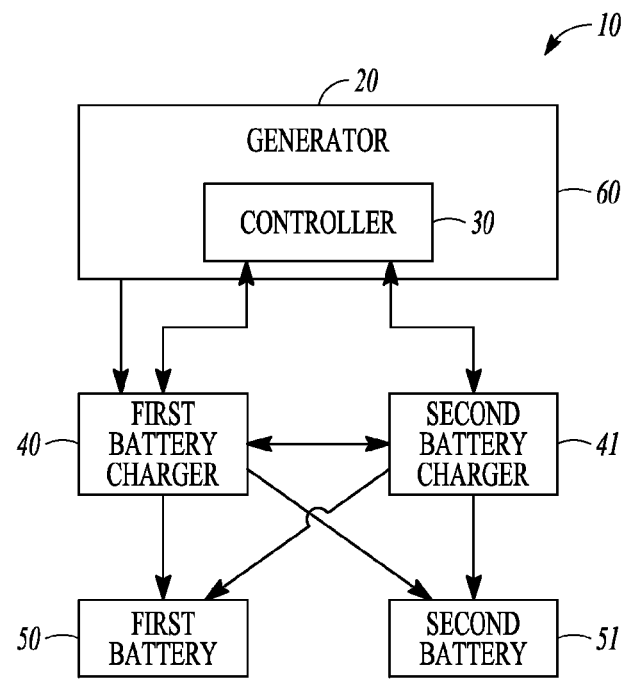
FIG. 3 is a functional block diagram similar to FIG. 1 where the power generation system includes a plurality of battery chargers.

In the example embodiment that is illustrated in FIG. 3, the controller 30 and the first generator 20 are located within the same enclosure 60. As shown in FIG. 3, the power generation system 10 may further include a second battery charger 41 that charges the second battery 51. The controller 30 determines which of the first battery 50 and second battery 51 receives charging current from at least one of the first battery charger 40 and the second battery charger 41. It should be noted that although only two battery chargers 40, 41 are shown in FIG. 3, any number of battery chargers may be included in the power generation system 10.

In the example embodiment that is illustrated in FIG. 3, the first battery charger 40 may be connected to the second battery charger 41 such that the first battery charger 40 and the second battery charger 41 are able to exchange power (and potentially operating data). In addition, the first battery charger 40 may be connected to the second battery 51 such that the second battery 51 receives charging current from the first battery charger 40, and the second battery charger 41 may be connected to the first battery 50 such that the first battery 50 receives charging current from the second battery charger 41.

Figure 4:
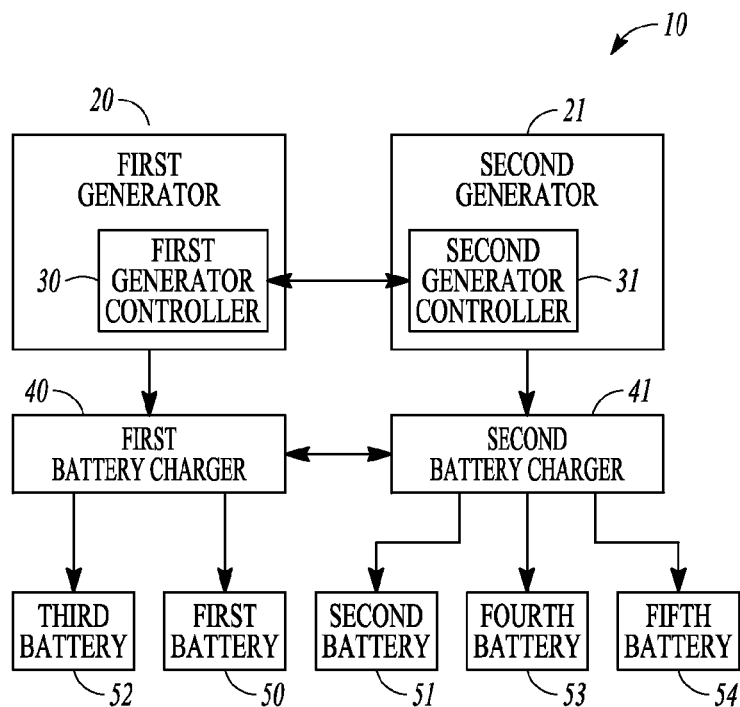
FIG. 4 is a functional block diagram similar to FIG. 1 where the power generation system includes a plurality of battery chargers, a plurality of generators and multiple batteries.

FIG. 4 is a functional block diagram where the power generation system 10 includes a plurality of battery chargers 40, 41, a plurality of generators 20, 21 and multiple batteries 50, 51, 52, 53, 54. In the example embodiment that is illustrated in FIG. 4, one or more of the batteries 50, 52, provide power to start the first generator 20, and one or more of the multiple batteries 51, 53, 54 provides power to start the second generator 21.

In the example embodiment that is illustrated in FIG. 4, the controller 30 serves as a generator controller for the first generator 20 and the power generation system 10 further includes an additional controller 31 that is a generator controller which operates the second generator 21. It should be noted that either, or both, of the controller 30 and the additional controller 31 may determine which of the multiple batteries 50, 51, 52, 53, 54 receives charging current from at least one of the first battery charger 40 and/or the second battery charger 41.

It should be noted that any battery charger and controllers that are included in the power generation system 10 may exchange data via a communication bus that connects the controller(s) and/or the battery charger(s). In addition, the battery charger(s) and/or controller(s) may exchange data wirelessly.

Referring again to FIG. 1, the power management system 10 further includes a server 70 that is connected to the controller 30 over a network (e.g., the Internet I, a local network and/or wireless forms of communication). In some embodiments, the server 70 provides commands to the controller 30 as to which of the first battery 50 and second battery 51 receives charging current from the first battery charger 40.

It should be noted that the server 70 may be included in the other embodiments that are shown in FIGS. 2-4 such that the server 70 provides commands to one or more of the controller 30, 31 as to which of the multiple batteries 50, 51, 52, 53, 54 receives charging current from at least one of the first battery charger 40 and/or the second battery charger 41. In addition, the server 70 may communicate directly with at least one of the first and second battery chargers 40, 41.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power generation system comprising:
    a first generator that includes an internal combustion engine and an alternator;
    a second generator that includes an internal combustion engine and an alternator;
    a first generator controller that operates the first generator;
    a second generator controller that operates the second generator;
    a first battery charger that is configured to charge a first battery and determine a state of charge for the first battery, wherein the first battery charger is configured to charge the first battery using power received from a primary power source, the alternator of the first generator or the alternator of the second generator;
    a second battery charger that is configured to charge a second battery and determine a state of charge for the second battery, wherein the second battery charger is configured to charge the second battery using power received from a primary power source, the alternator of the first generator or the alternator of the second generator; and
    wherein at least one of the first generator controller and second generator controller determines which of the first battery charger and second battery charger is supplied with power from the primary power source, the alternator of the first generator or the alternator of the second generator, wherein the first battery and the second battery are each configured to provide power to start the first generator, wherein the first battery and the second battery are each configured to provide power to start the second generator, and wherein the first battery charger is configured to charge the second battery and determine a state of charge for the second battery, and the second battery charger is configured to charge the first battery and determine a state of charge for the first battery.

2. The power generation system of claim 1, wherein the first generator controller displays information relating to operating parameters of the first generator, the second generator, the first battery charger and the second battery charger.

3. The power generation system of claim 1, wherein the second generator controller displays information relating to operating parameters of the first generator, the second generator, the first battery charger and the second battery charger.

4. The power generation system of claim 1, wherein the first generator controller exchanges signals with the second generator controller relating to a state of charge of the first battery and the second battery.

* * * * *